(12) United States Patent
Vezzoli et al.

(10) Patent No.: US 8,764,125 B2
(45) Date of Patent: Jul. 1, 2014

(54) HYDRAULIC PUMP

(75) Inventors: Giancarlo Vezzoli, Brescia (IT);
Gabriele Di Pietro, Pistoia (IT);
Samuele Laghi, Prato (IT); Marco Fiesoli, Campi Bisenzio (IT)

(73) Assignee: Formula S.R.L., Prato (IT)

( * ) Notice: Subject to any disclaimer, the term of this patent is extended or adjusted under 35 U.S.C. 154(b) by 595 days.

(21) Appl. No.: 12/515,625

(22) PCT Filed: Jan. 24, 2008

(86) PCT No.: PCT/IB2008/000227
§ 371 (c)(1),
(2), (4) Date: Jun. 16, 2009

(87) PCT Pub. No.: WO2008/093226
PCT Pub. Date: Aug. 7, 2008

(65) Prior Publication Data
US 2010/0052415 A1    Mar. 4, 2010

(30) Foreign Application Priority Data
Jan. 31, 2007   (IT) ................. FI2007A0018

(51) Int. Cl.
*B60T 11/00* (2006.01)
(52) U.S. Cl.
USPC ........................ 303/10; 188/24.22; 188/344
(58) Field of Classification Search
USPC .......... 303/10; 188/24.11, 151 R, 344, 24.22,
188/26; 60/565, 581, 583, 584, 587–589,
60/594; 74/501.5 H, 500.5, 502.2, 503;
417/490, 501, 547
See application file for complete search history.

(56) References Cited

U.S. PATENT DOCUMENTS

| | | | | |
|---|---|---|---|---|
| 4,244,185 A * | 1/1981 | Belart | ............................ | 60/550 |
| 4,741,161 A * | 5/1988 | Belart et al. | ................. | 60/547.1 |
| 6,003,639 A * | 12/1999 | Buckley et al. | ................. | 188/26 |
| 6,318,514 B1 * | 11/2001 | Hinkens et al. | ............ | 188/73.38 |
| 6,370,877 B1 * | 4/2002 | Lin | ................................. | 60/588 |
| 6,804,961 B2 * | 10/2004 | Lumpkin | ........................ | 60/588 |
| 7,137,492 B2 * | 11/2006 | Laghi | ............................ | 188/344 |
| 7,197,875 B2 * | 4/2007 | Henifin | .......................... | 60/584 |
| 2006/0213192 A1 | 9/2006 | Henifin | | |
| 2011/0135521 A1 * | 6/2011 | Vezzoli | ........................ | 417/429 |

FOREIGN PATENT DOCUMENTS

EP    1 514 757    3/2005
GB    2 141 498    12/1984

* cited by examiner

*Primary Examiner* — Thomas Irvin
(74) *Attorney, Agent, or Firm* — McGlew and Tuttle, P.C.

(57) ABSTRACT

A hydraulic pump comprising a containment body (2) having inside a cylindrical cavity (3) provided with a conduit (4) communicating with a hydraulic actuator and capable of holding a fluid. A piston (5) is movable in the cylindrical cavity (3) and a reservoir (12) of the fluid is in fluid communication with the cylindrical cavity (3). Actuation means (6) connected to the piston (5) move the piston (5) within the cylindrical cavity (3) to operate the hydraulic actuator. The pump also comprises means (13) for closing or opening the connection between the reservoir (12) and the cylindrical cavity (3). The reservoir (12) is substantially lined up with the cylindrical cavity (3) along an axis of longitudinal development (X) of same cylindrical cavity (3), so as to reduce the overall dimensions and the weight of the pump.

14 Claims, 14 Drawing Sheets

HYDRAULIC PUMP

TECHNICAL FIELD

The present invention relates to a hydraulic pump for operating a hydraulic servo actuator, in particular a caliper of disc brakes for bicycles and motorcycles.

BACKGROUND ART

As it is known, the disc brake comprises a disc solid to the wheel and a caliper mounted on a bracket engaged to the yoke of the motorcycle or directly on the frame and/or on the fork.

The caliper is provided with small pistons which exert a braking action on the disc by operating, for example, a pedal pump mounted in proximity of one of the motorcycle footboards.

The pump comprises a piston sliding and/or rotating within a cylinder intended to hold fluid and moved, via suitable linkages, by the driver-operated pedal.

The cylinder has an opening at a longitudinal end thereof, opposite to the piston and connected, by means of a suitable hydraulic connection, to the caliper, or servo actuator, of the rear brake. In the known calipers, the pump is further provided with a compensating reservoir exhibiting a conduit which leads on a side wall of the cylinder into two holes being in side-by-side relationship, a feeding hole and a compensating hole. The piston has two gaskets tight-seal sliding on the inner wall of the cylinder, and a central portion interposed between said gaskets and delimiting an annular compensating chamber or space. The feeding hole—when the fluid is under pressure during the motion of the piston—leads always into the compensating space, while the compensating hole opens always onto and between the ends delimiting the gaskets.

The feeding hole has the function—besides allowing the expansion of the fluid in case the latter is heated up—also of recirculating a greater amount of brake fluid, as required by the wear of the pads. In fact, in the absence of the feeding hole, the pump's piston would advance upon every braking action by a minimum additional extent owing both to the wear of the pads and the exceeding stroke length that the pistons of the calipers have to perform. Instead, with the compensating mechanism, upon releasing the pressurizing control, the caliper's pistons move back by approximately the same extent ("roll back" effect of the caliper piston's gaskets) and the piston of the pump moves back to a position which does not coincide with the previous one. However, the increase in volume between the piston's main gasket and the pistons of the calipers is compensated through the feeding hole.

The volume of fluid necessary for the compensation is therefore taken usually from the reservoir through the feeding hole and, only in case of anomalous wear or knock off, from the intermediate compensating chamber between the two gaskets of the pump's piston with a lowering of the lip of the main gasket and the withdrawal of fluid from the compensating reservoir through the compensating holes disposed on the pump's float.

The Applicant has however found out that the structure of the current compensating systems is bulky and weighs heavily on the overall dimensions and weight of the pumps of known type.

Since in the field, for example, of motorcycles and bicycles—and in general in all cases where highest performance levels are sought—the current trend is to reduce weights and dimensions in order to increase the handling and performance of the means in question, the weight and dimensions of a component like the brake pump are also of great consideration.

In particular, the presence of the two holes lined up along the cylinder of the pump, and the presence of the compensating chamber located between said gaskets, is cause for a sizeable axial development of the brake pumps of known type.

A further drawback of the known systems is the limited duration of the main gasket, due to the fact that the feeding hole may have small rugs left by the manufacturing process, which require costly machining operations to remove them and, if not removed, may be cause of an early wear out the gasket, especially under operating conditions. Moreover, in the first phase of compression of the fluid held in the main chamber, the main gasket must close the feeding hole quickly, so as to prevent a portion of the fluid from returning into the reservoir and thereby nullifying the effect of part of the working stroke. Such closing is, in the known pumps, committed to the axial sliding of the piston which is solid to said main gasket, and takes place with some delay after the actuation of the pump, also according to the idle stroke.

DISCLOSURE OF THE INVENTION

In this context, the specific technical task of the present invention is to provided a pump, for example for disc brakes of bicycles and motorcycles, able to overcome the above cited drawbacks.

In particular, the object of the present invention is to provide a pump, for example for disc brakes of bicycles and motorcycles, which is compact and light-weight.

It is also an object of the present invention to provide a pump able to improve a steady operation and, thus, the duration of the pump, and in particular of the sealing means.

The above technical task and the specified objects are substantially achieved by a hydraulic pump comprising the technical characteristics set forth in one or more of the appended claims.

Further characteristics and advantages of the present invention will appear more clearly from an indicative and thus non-limiting description of a preferred but not exclusive embodiment of a hydraulic pump, as illustrated in the accompanying drawing, wherein:

FIG. 1 is a longitudinal section view of a first embodiment of hydraulic pump, according to the invention, in a first rest position;

FIG. 1*a* shows an enlarged portion of the pump in FIG. 1;

FIG. 2 is a longitudinal section view of the pump in FIG. 1, in a second position in which the pump is partially actuated;

FIG. 2*a* shows the enlarged portion of FIG. 1 when the pump is in the position of FIG. 2;

FIG. 3 is a longitudinal section view of the pump in FIG. 1 in a third generic work position;

FIG. 3*a* shows the enlarged portion of FIG. 1 when the pump is in the position of FIG. 3;

FIG. 4 is a longitudinal section view of a second embodiment of hydraulic pump, according to the invention, in a first rest position;

FIG. 4*a* shows an enlarged portion of the pump in FIG. 4;

FIG. 5 is a longitudinal section view of the pump in FIG. 4, in a second position in which the pump is partially actuated;

FIG. 5*a* shows the enlarged portion of FIG. 5;

FIG. 6 is a longitudinal section view of the pump in FIG. 4 in a third generic work position;

FIG. 6*a* shows the enlarged portion of FIG. 6;

Figure 1:
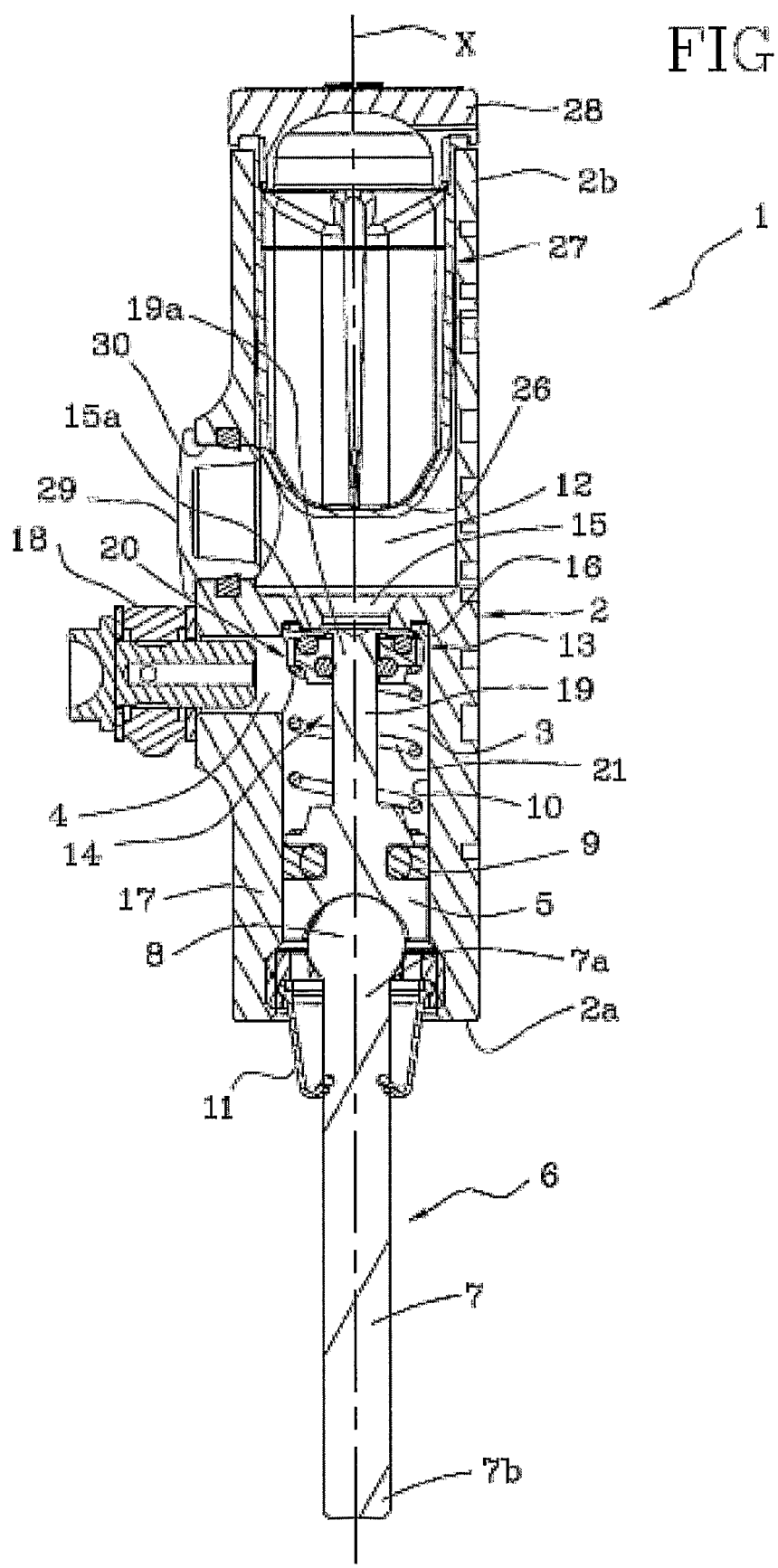

With reference to the attached figures, numeral 1 indicates in the whole a hydraulic pump for hydraulic servo actuators such as calipers of disc brakes, according to the present invention.

In particular, shown in the attached figures is the preferred but non-limiting embodiment of a pump 1.

The pump 1 comprises a containment body 2 which delimits thereinside a cylindrical cavity 3 able to hold fluid and be in fluid communication, via a suitable conduit 4, with a hydraulic servo actuator, for example a brake caliper of a type known per se and not to be illustrated in greater detail.

Usually, the caliper is connected to the conduit 4 of the pump 1 via a hose, not shown, anchored for example at one or more points of the frame and/or at the yoke of the motorcycle.

A piston 5 is mounted in the cylindrical cavity 3 and is axially movable therein, under control of actuation means 6 connected to the piston 5 and operated by the driver, to push the fluid in the conduit 4 so as to cause a clamping of the pads onto the disc brake.

More in particular, the actuation means 6 comprise a rod 7 projecting by a first end 2a of the containment body 2 and exhibiting a first end 7a thereof connected to the piston 5, preferably through a ball joint 8.

A second end 7b of rod 7, opposite to the first 7a, can be engaged in a manner known per se to an actuation member, not shown, mounted in proximity of the motorcycle's footboard.

The piston 5 comprises a sealing means, such as a gasket 9 being slid into abutment against an inner surface 10 of the cylindrical surface 3 to ensure fluid sealing.

Also preferably mounted on the first end 2a of the containment body 2 is a flexible dust cover 11 developing around the rod 7 and anchored to the same rod 7 to follow the movements thereof.

The pump 1 also comprises a fluid compensating reservoir 12 in fluid communication with the cylindrical cavity 3, and means 13 for closing or opening the connection between the reservoir 12 and said cylindrical cavity 3.

With reference to the embodiment shown in FIGS. 1-3a, said means 13 for closing or opening the connection between the reservoir 12 and said cylindrical cavity 3 comprise a closing device 14 movable in consequence of the displacement of piston 5 between a position for the opening and one for the closing of a port 15 allowing communication between said reservoir 12 and said cylindrical cavity 3. Advantageously, the reservoir 12 is substantially aligned with said cylindrical cavity 3, and the port 15 opens up onto the top 16 of the cylindrical cavity 3 and lies in a position axially opposite to the first end 2a of the containment body 2. The reservoir 12 develops therefore by the opposite side of rod 8 along the axis "X", longitudinally to the cylindrical cavity 3, to the piston 5 and to the same rod 7. Moreover, as illustrated in this embodiment, also the compensating reservoir 12 is delimited by the containment body 2 which, therefore, includes as a whole both the pumping unit, cylinder 3-piston 5, and the reservoir 12.

The conduit 4 for communication with the hydraulic actuator opens up onto a side wall 17 of the containment body 2 and is in proximity of the top 16 of cavity 3 and the port 15. A connector 18 of known type is installed in said conduit 4, and the pipe (not shown) feeding the fluid to the caliper is mounted on said connector 18.

The piston 5 is movable between a rest or retracted position in which it lies close to the first end 2a of the containment body 2, and an active or advanced position in which it lies close to the top 16 of the cavity 3.

In greater detail, the closing device 14 comprises a stem 19 connected to the piston 5 and developing within the cylindrical cavity 3 along the longitudinal axis "X". The stem 19 is movable through the communication port 15 during the motion of piston 5 between the rest position and the active position.

A body 20 is slidingly and sealingly mounted around the stem 19, and elastic means 21 having preferably the form of a spiral spring are interposed between the piston 5 and body 20 to push the same body 20 toward a distal end 19a of stem 19, opposite to piston 5 and against a peripheral edge 15a of the communication port 15.

Figure 1A:
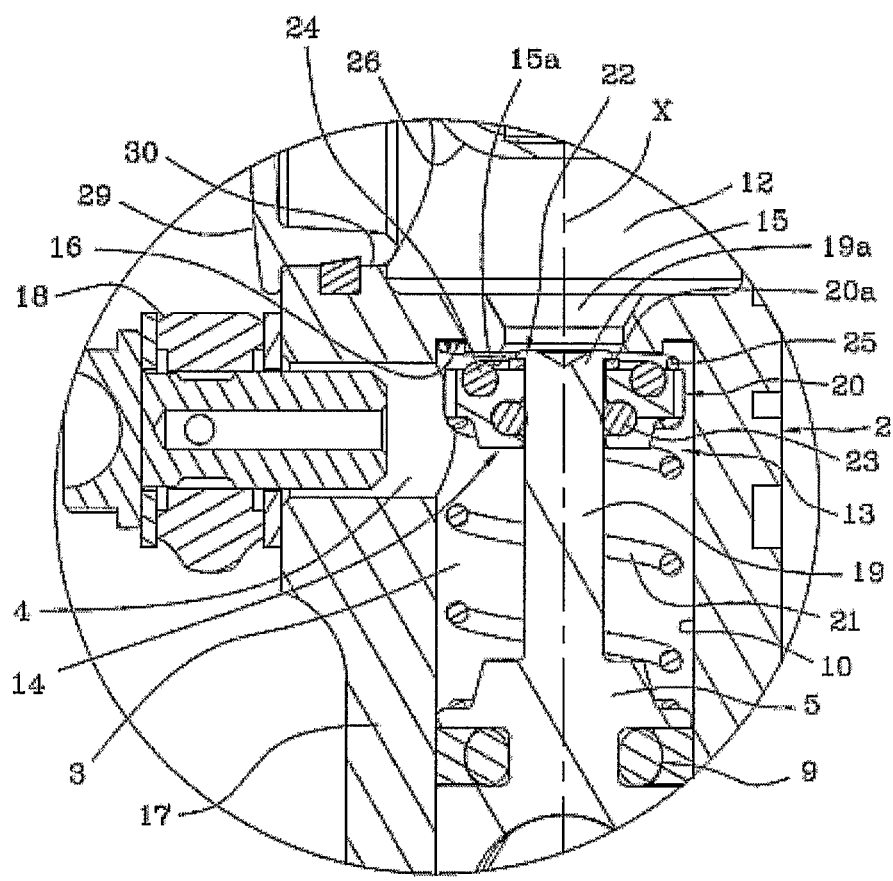

As best visible in FIG. 1a, the said distal end 19a has a relief 22 against which the body 20 is made to abut being pushed by the spring 21 preferably with the interposition of a spacer 20a. The body 20 is provided with a first gasket 23 mounted on an inner radial portion of same body 20 and put in sliding contact with the stem 19. A second gasket 24 is installed on a portion of the same body 20 in facing relationship with the surface 16 of cylindrical cavity 3 and surrounding the distal end 19a of stem 19. Ancillary elastic means 26 defined, in this non-limiting example, by a turn of a second spiral spring, are interposed between the body 20 and the peripheral edge 15a of communication port 15 and are able to move the body 20 away from said port 15.

When the piston 5 lies in the rest position (FIGS. 1 and 1a), the distal end 19a of stem 19 is close to the port 15, and the body 20 being pushed by the spring 21 lies in contact with the relief 22. In such position, the second gasket 24 of body 20 is spaced apart from the peripheral edge 15a of port 15, so as to delimit an annular passage between the cylindrical cavity 6 and the reservoir 12.

Figure 2:
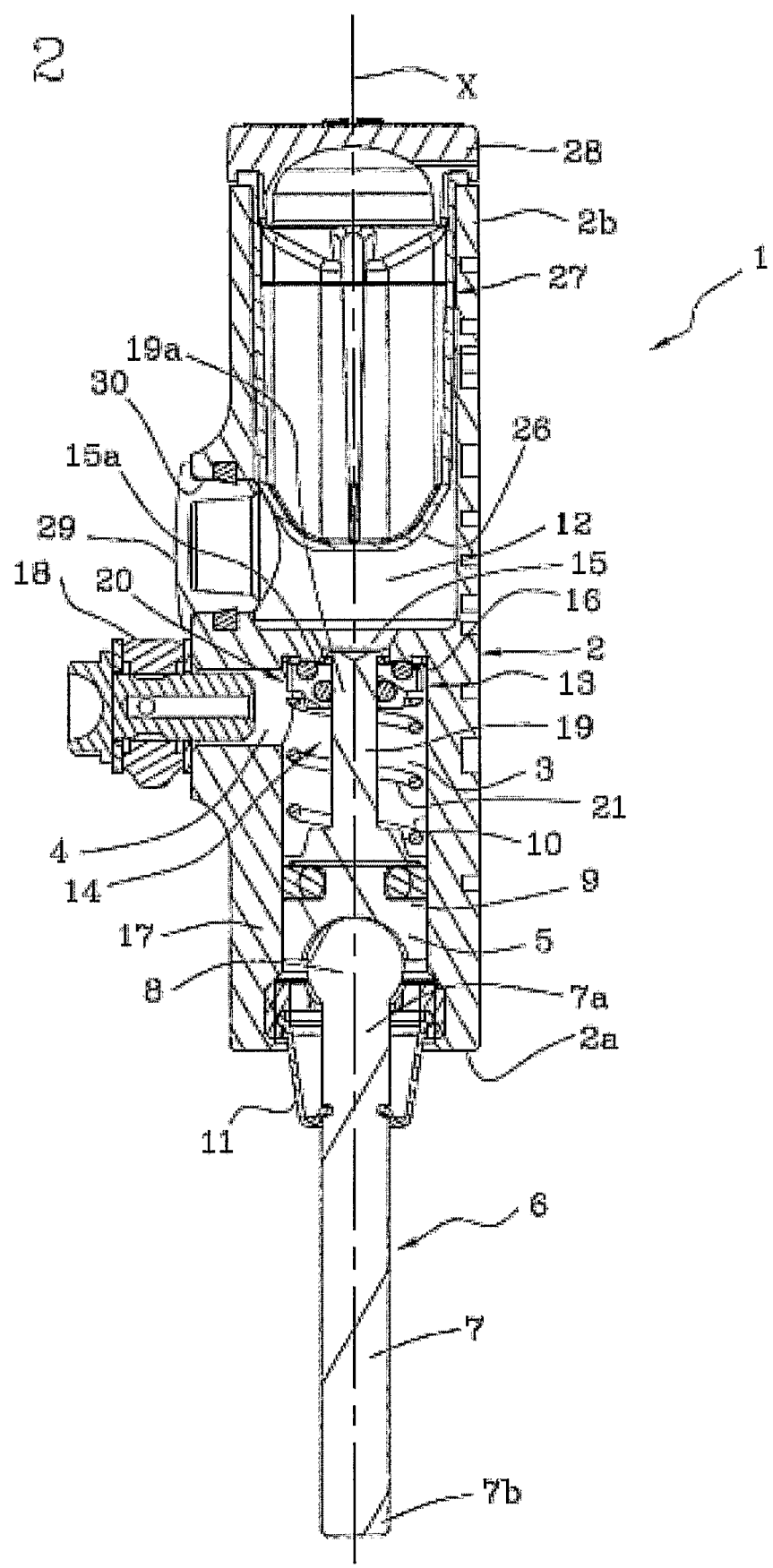
Figure 2A:
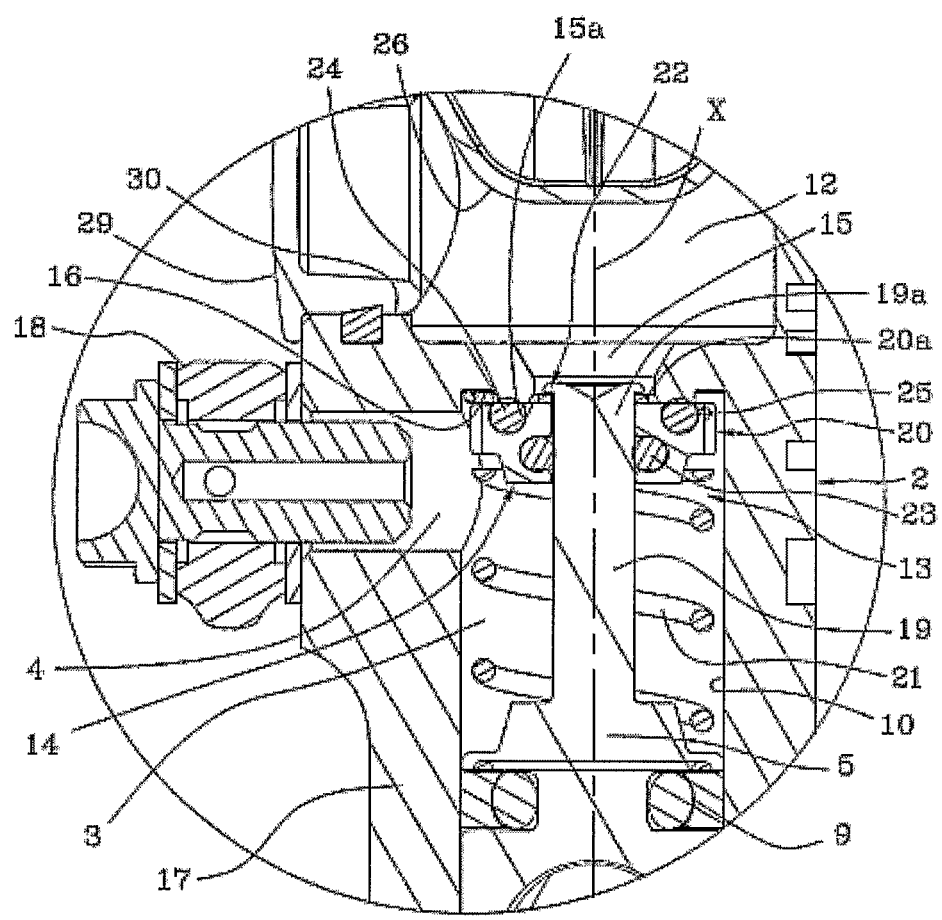

The thrust exerted by the driver through the rod 7 determines firstly a united movement of piston 5, stem 19 and closing body 20, thereby counteracting the second spiral spring 25. The second gasket 24 is pushed against the peripheral edge 15a of port 15 and shuts off the communication between the cylindrical cavity 3 and the reservoir 12 (FIGS. 2 and 2a). Once the communication between the cylindrical cavity 3 and the reservoir 12 is shut off, the thrust exerted by piston 5 is cause for a pressurization of the fluid present in the cavity 3 without influencing the fluid held in the reservoir 12.

Figure 3:
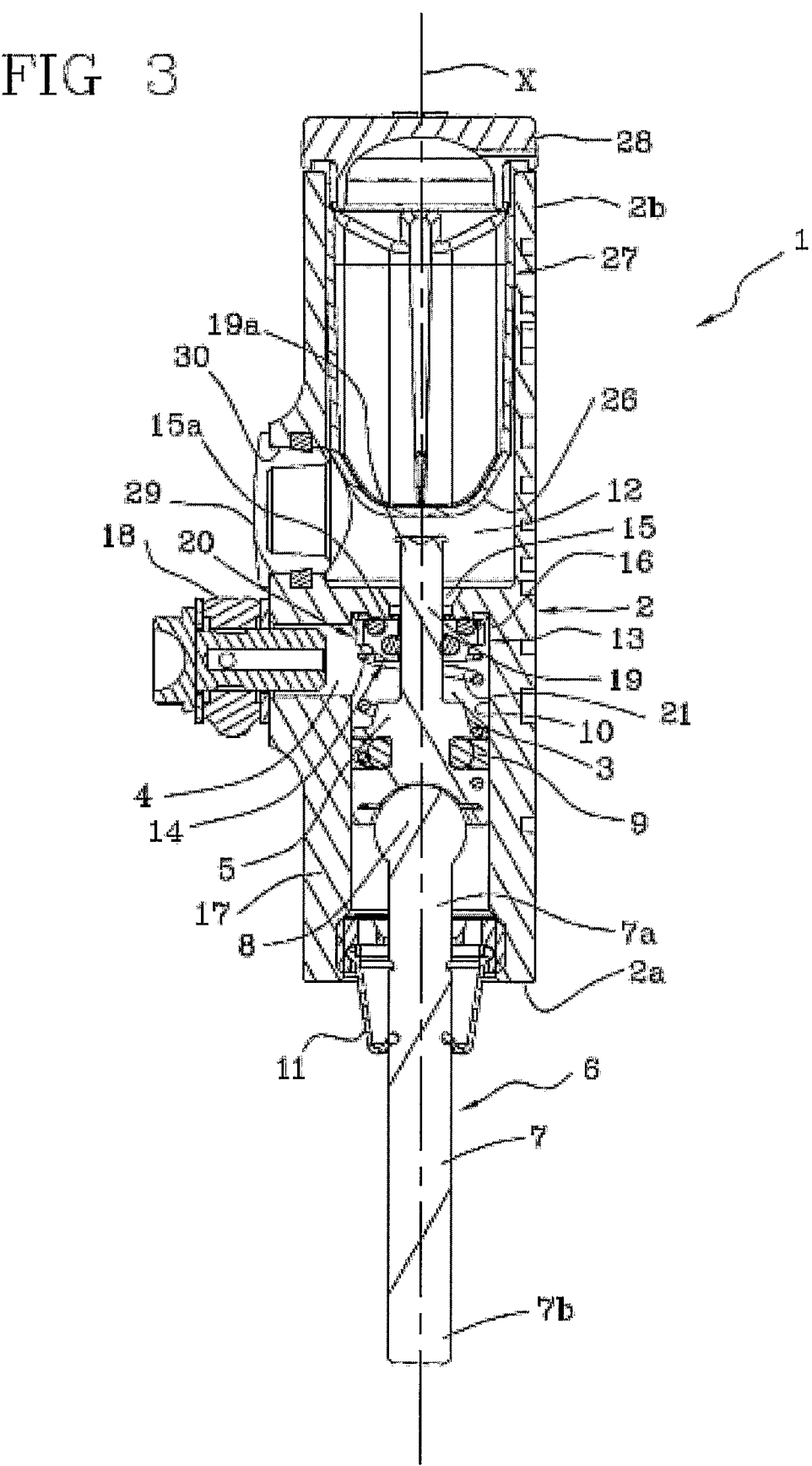
Figure 3A:
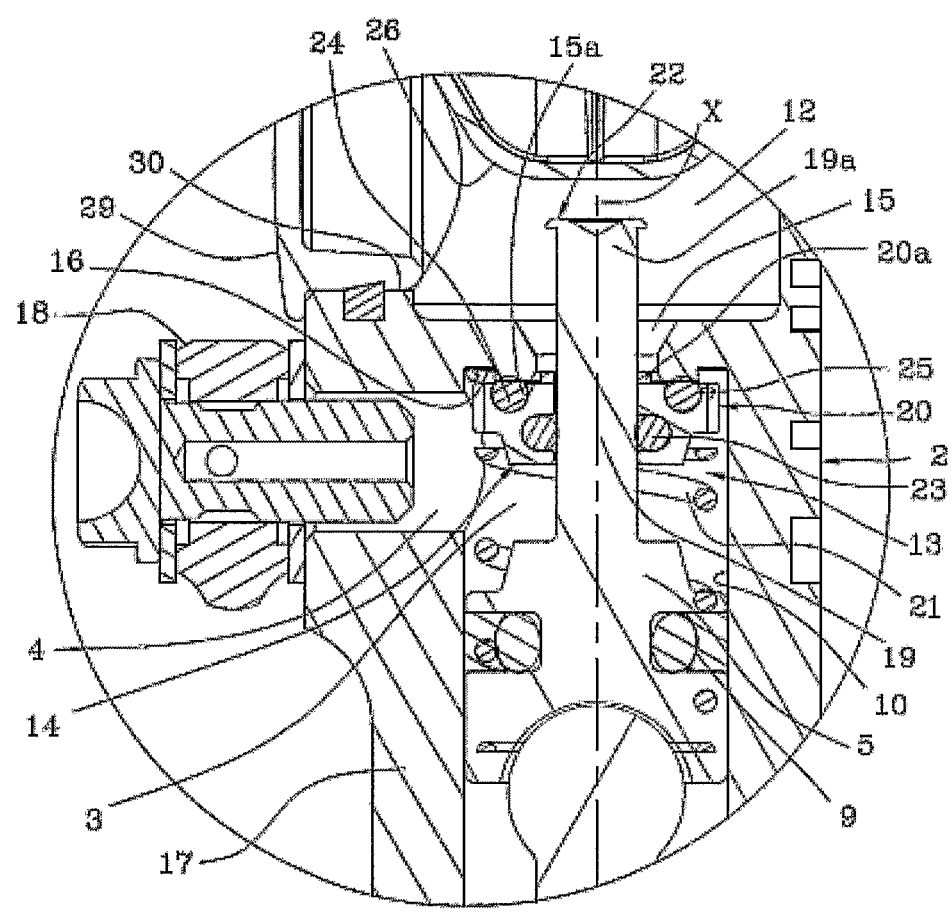

The further advancement of piston 5 in opposition to the first spring 21, causes a translation of stem 19 within the body 20, which remains almost steady with respect to the containment body 2, the said stem 19 entering partially into the reservoir 12 (FIGS. 3 and 3a).

Upon disengaging the rod 7, the first spring 21 is of help in bringing the piston 5 back to the rest position, and the second spring 25 pushes the closing body 20 and re-opens the port 15.

To compensate for the reduction of volume, as determined by the introduction of the stem 19 into the reservoir 12 (FIGS. 3 and 3a) and the wear of the pads, the pump 1 comprises also a movable wall 26 delimiting the reservoir 12 and preferably defined by an elastic membrane. In the illustrated embodiment, said wall 26 is elastically deformable between a first position in which it lies for moving close to the port 15, and a second position in which it lies for moving away from said port 15.

More in particular, the pump 1 comprises an elastic capsule 27 inserted into a housing of the containment body 2, which housing delimits the reservoir 12 at the bottom, that is close to port 15. The capsule 27 defines the movable elastic wall 26 at the bottom and is advantageously closed on top, that is, in proximity of a second end 2b of the containment body 2, by a plug 28.

Finally, a lower plug 29 closes a side opening 30 formed in the containment body and leading into the reservoir 12. Such opening 30 has the function to control the level of fluid within the same reservoir 12.

Described herebelow with reference to FIGS. 4-6a is a second embodiment of a pump according to the present invention.

Advantageously, also in this embodiment the reservoir 12 is generally lined up with the cylindrical cavity 3.

The reservoir 12 develops therefore by the opposite side of rod 8 along the longitudinal axis "X" shared by the cylindrical cavity 3, the piston 5 and the same rod 7. Moreover, as illustrated in this preferred embodiment, also the compensating reservoir 12 is advantageously delimited by the containment body 2 which, therefore, includes, as a whole, both the pumping unit, cylinder 3-piston 5, and the reservoir 12.

The conduit 4 in communication with the hydraulic actuator opens up onto a side wall 17 of the containment body 2 and is close to the top 16 of cavity 3.

A connector 18 is installed in such conduit 4 by means of known mechanisms, and the hydraulic connection (not shown) which feeds the fluid to the caliper is mounted on said connector 18.

Also in this solution provision is made for the piston 5 to be movable between a rest or retracted position in which it lies close to the first end 2a of the containment body 2, and an active or advanced position in which it lies close to the top 16 of cavity 3.

More in particular, the means 13 for closing or opening the connection between the reservoir 12 and the cylindrical cavity 3 also comprise a stem 19 united to the piston 5 and developing within the cylindrical cavity 3 along the longitudinal axis "X".

Figure 6:
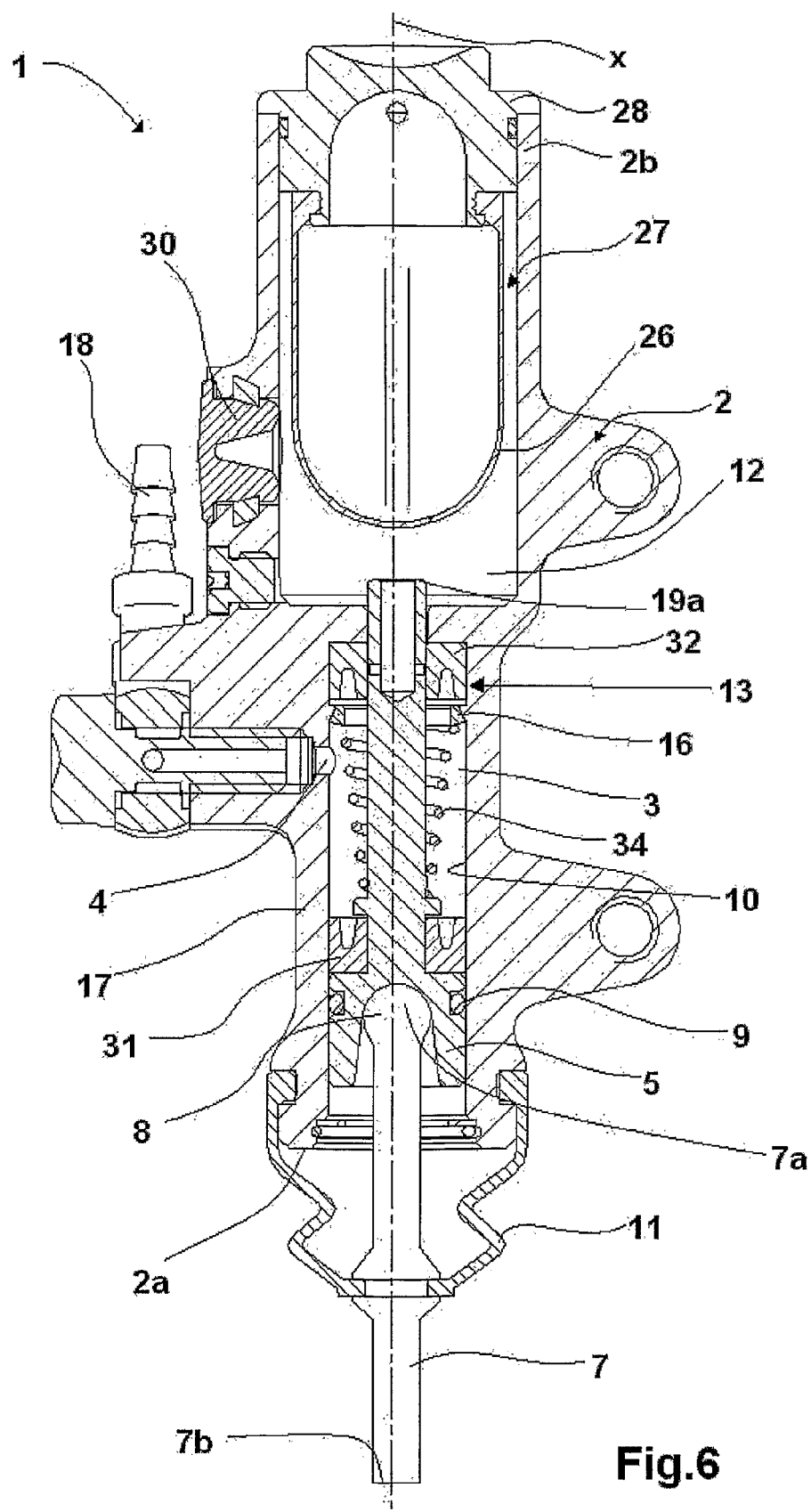
Figure 6A:
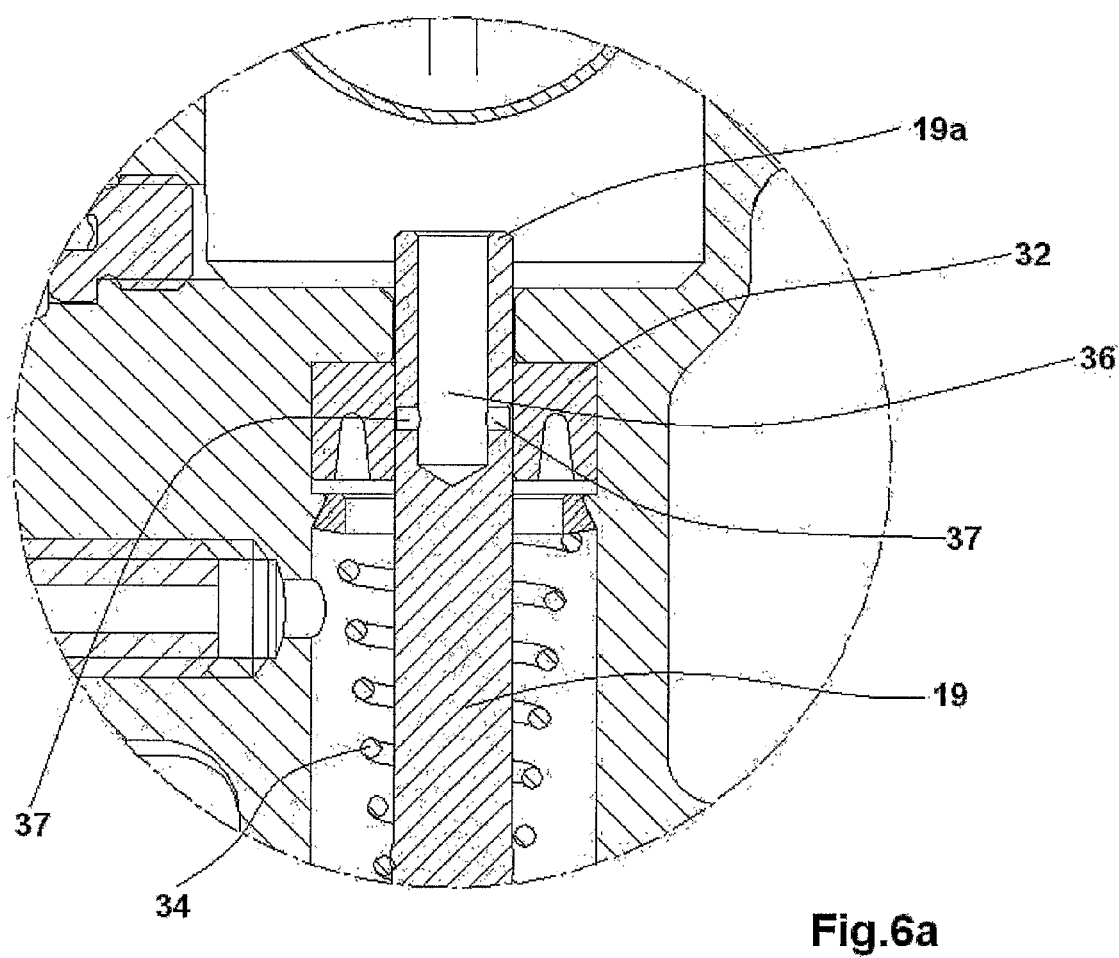

The stem 19 is movable during the motion of piston 5 between the rest position (FIGS. 4 and 4a) and the active position (FIGS. 6 and 6a).

In particular, in proximity of the end 19a of stem 19, away from piston 5, the stem 19 comprises a plurality of conduits 36, 37 for the passage of the fluid from the compensating reservoir 12 to the cylindrical cavity 3.

Figure 4:
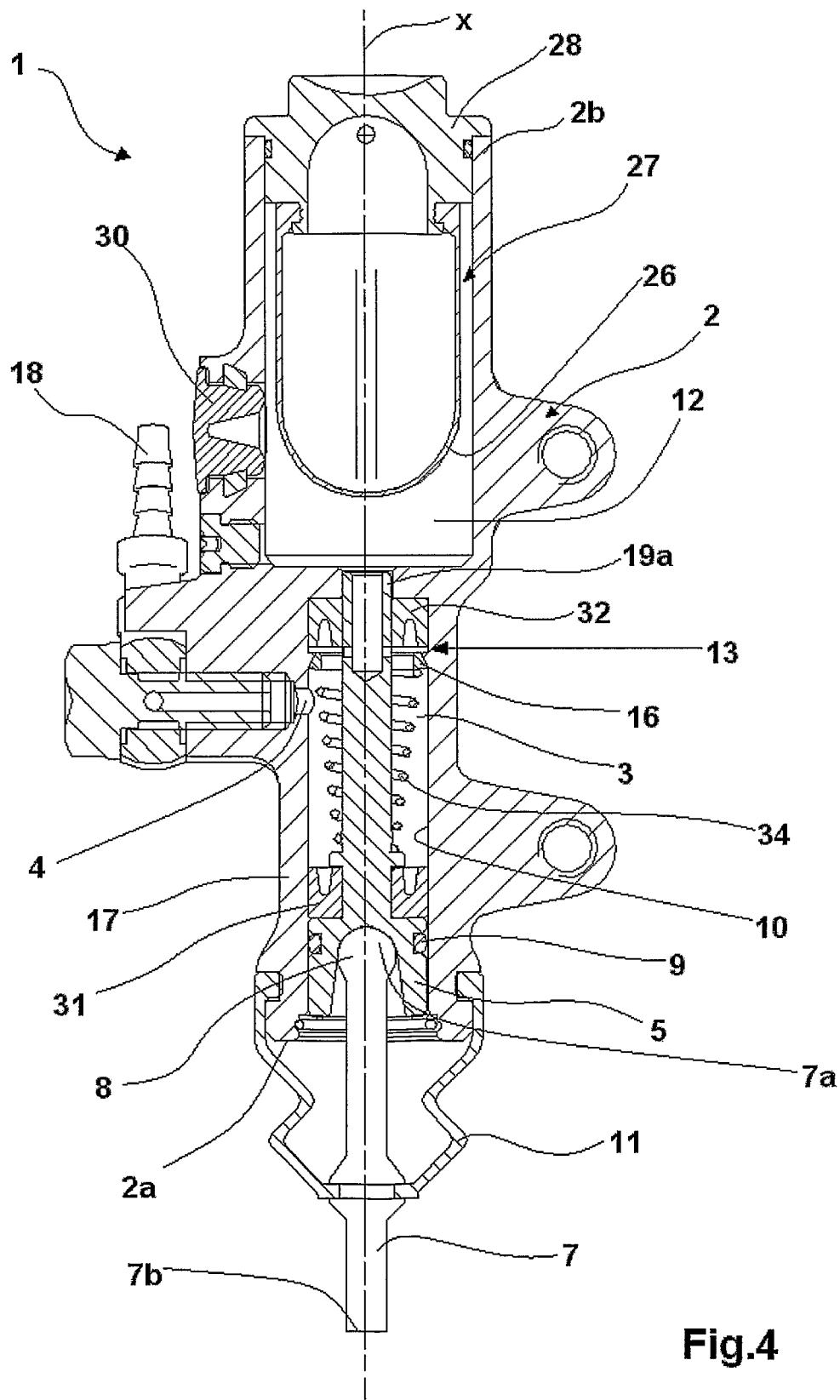
Figure 4A:
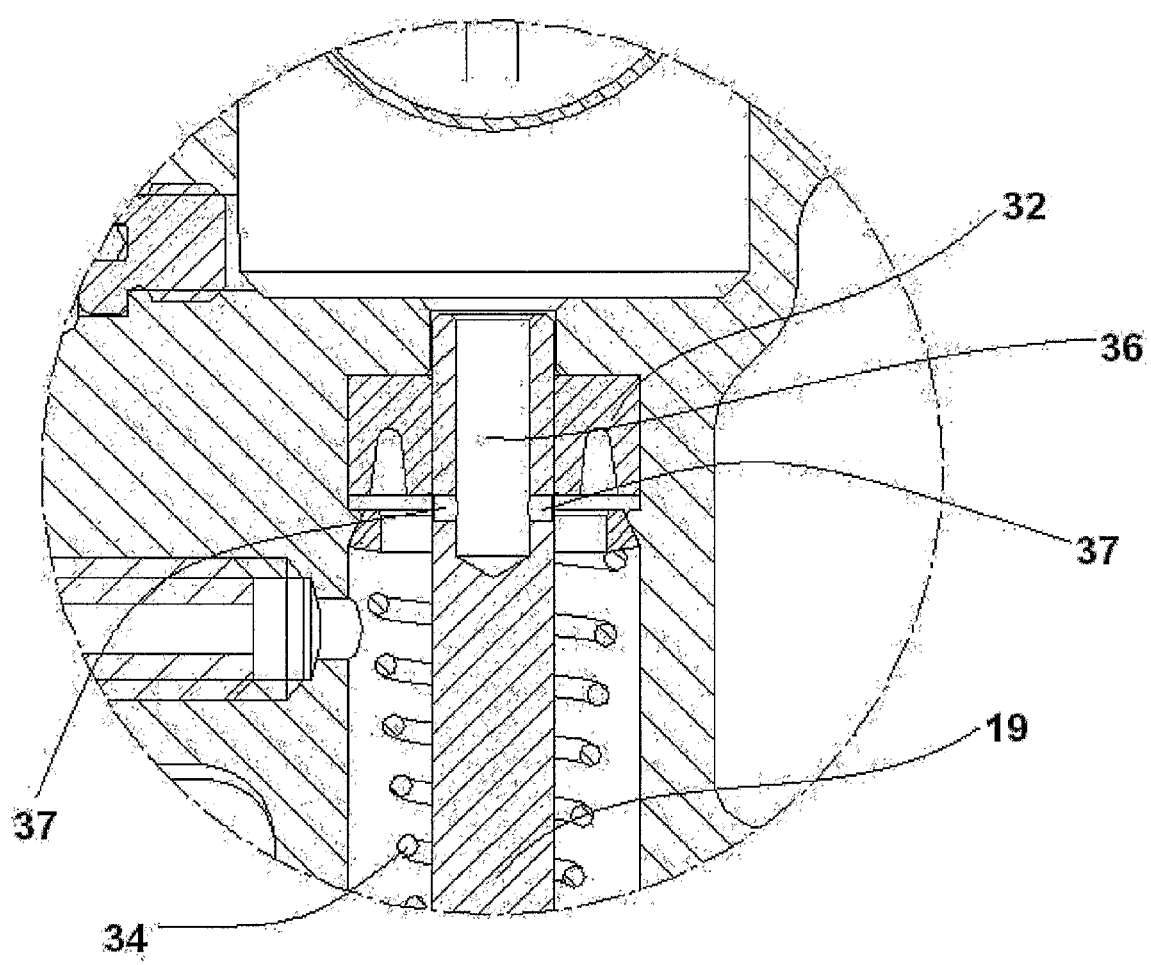
Figure 5:
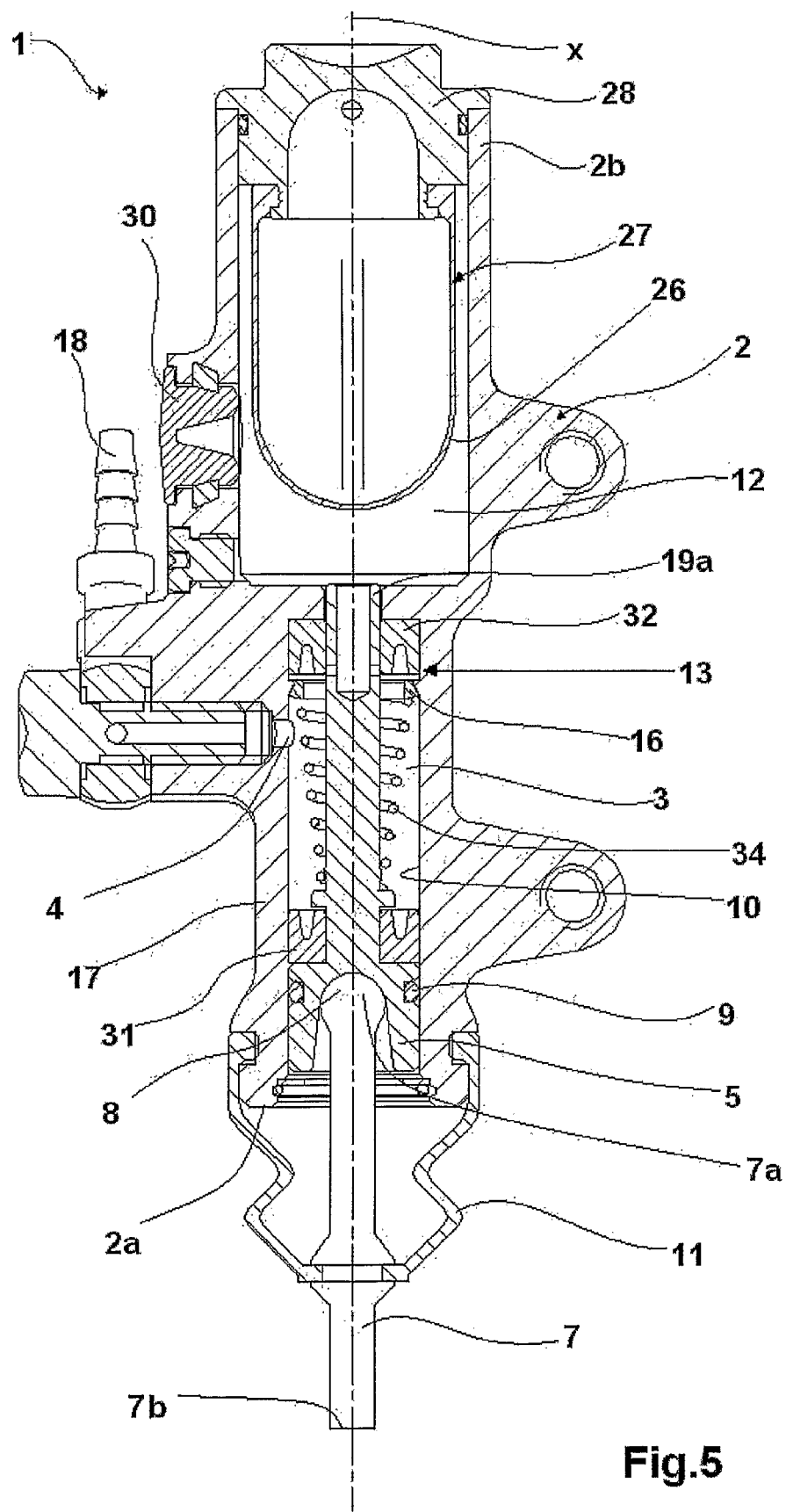
Figure 5A:
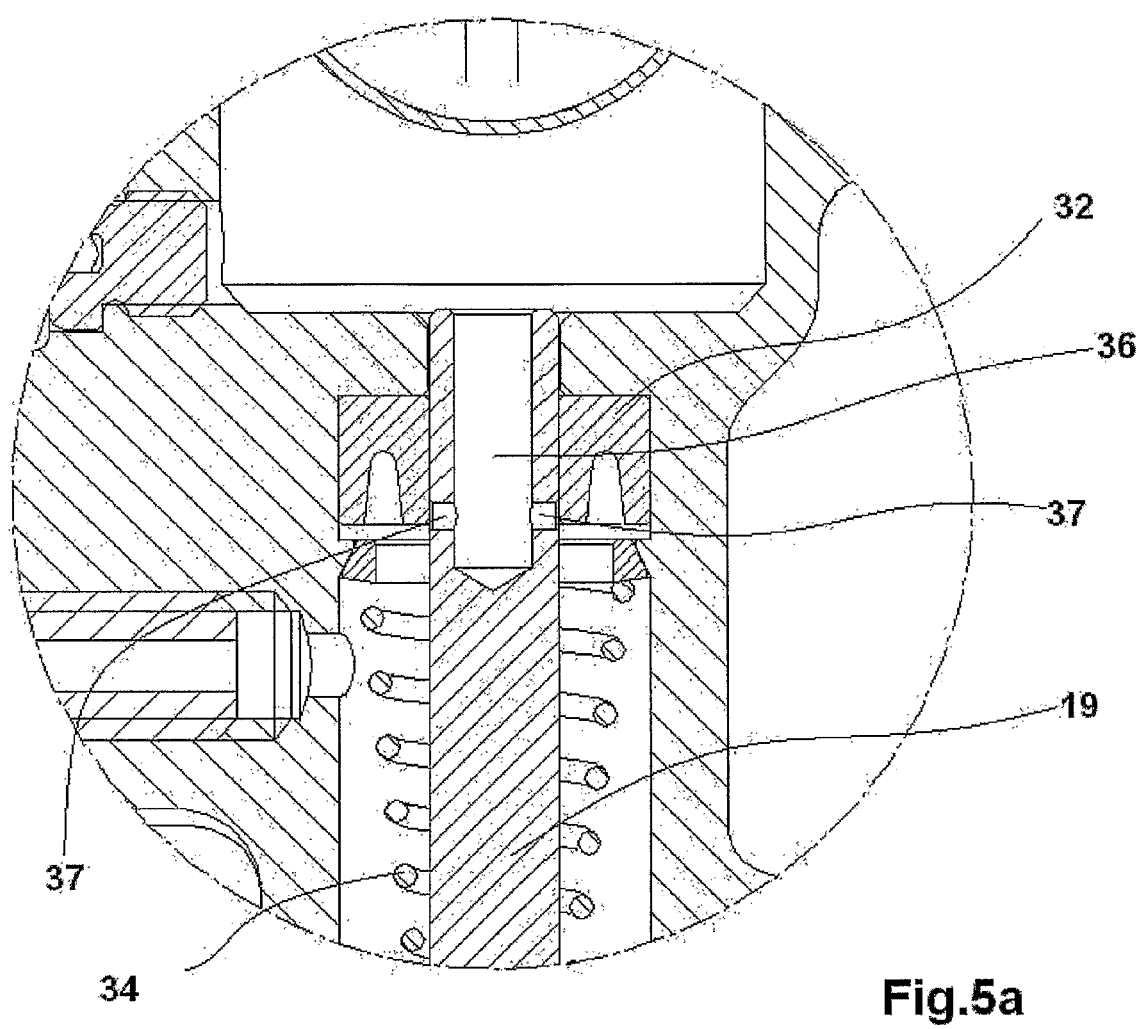

As best visible in FIG. 4a, the stem has a main conduit 36, generically oriented mostly in the directions parallel to the axis "X", with which other secondary conduits 37 are connected.

This embodiment also comprises two further sealing means, for example two gaskets 31, 32, the first 31 of which is preferably mounted slidingly and sealingly around the stem 19, while the second 32 is mounted with interference on the top 16 of the cylindrical cavity 3.

The pump also comprises elastic means 34 preferably in the form of a spiral spring, which are interposed between the piston 5 and the second gasket 32, to facilitate the return of piston 5 to the rest or retracted position and to keep the gasket 32 in place.

When the piston 5 is in the rest position (FIGS. 4 and 4a), the secondary conduits 37 on the distal end 19a of stem 19 are so disposed as to put in fluid contact the compensating reservoir 12 with the cylindrical cavity 3.

The generic thrust onto the rod 7 first determines the movement of piston 5 in conjunction with the stem 19. The secondary conduits 37, being formed inside the stem 19, move along with the latter, thereby missing the fluid communication with the cylindrical cavity 3.

Once the fluid communication has been shut off, the thrust exerted by the piston 5 is used for putting the fluid in the chamber 3 under pressure, with no effect on the fluid contained in the reservoir 12.

The further advancement of piston 5 in opposition to the spring 34, causes a translation of stem 19 within the body 20 by partially penetrating into the reservoir 12 (FIGS. 6 and 6a).

Upon releasing the operating force on the rod 7, the spring 34 is of aid in bringing the piston 5 back to the rest position; thereby re-establishing the fluid communication between the reservoir 12 and cavity 3 through the main conduit 36 and the secondary conduits 37.

Also in this embodiment, in order to compensate for the reduction of volume, as determined by the introduction of the stem 19 into the reservoir 12 (FIGS. 6 and 6a), the pump 1 comprises also a wall 26 delimiting the reservoir 12 and being preferably defined by an elastic membrane.

In the illustrated embodiment, said wall 26 is elastically deformable between a first position ready for moving close to the port 15, and a second position ready for moving away from said port 15.

More in particular, the pump 1 comprises an elastic capsule 27 inserted into a housing of the containment body 2, which housing delimits the reservoir 12 at the bottom.

The capsule 27 defines the movable elastic wall 26 at the bottom and is closed on top, that is, in proximity of a second end 2b of the containment body 2, preferably by a plug 28.

Finally, advantageously, a lower plug 29 closes a side opening 30 formed in the containment body and leading into the reservoir 12.

Figure 7:
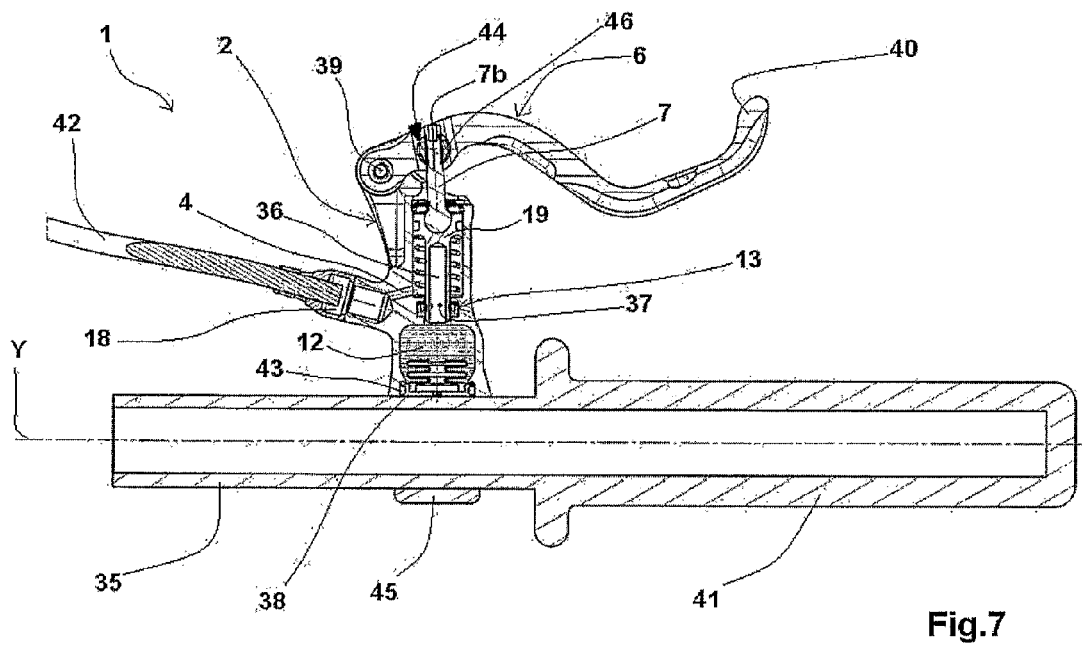
FIG. 7 is a section view of a possible application of a hydraulic brake according to the invention.
Figure 8:
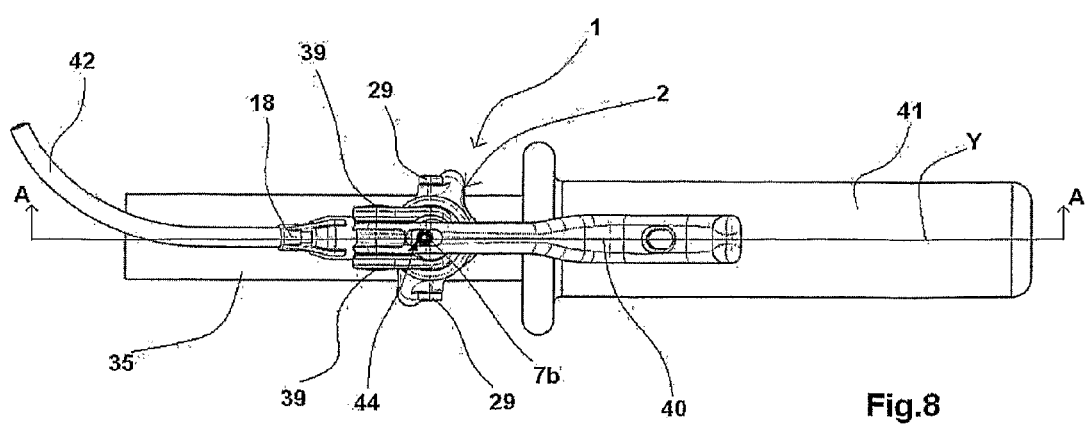
FIG. 8 is a front view of the application of FIG. 7.
Figure 9:
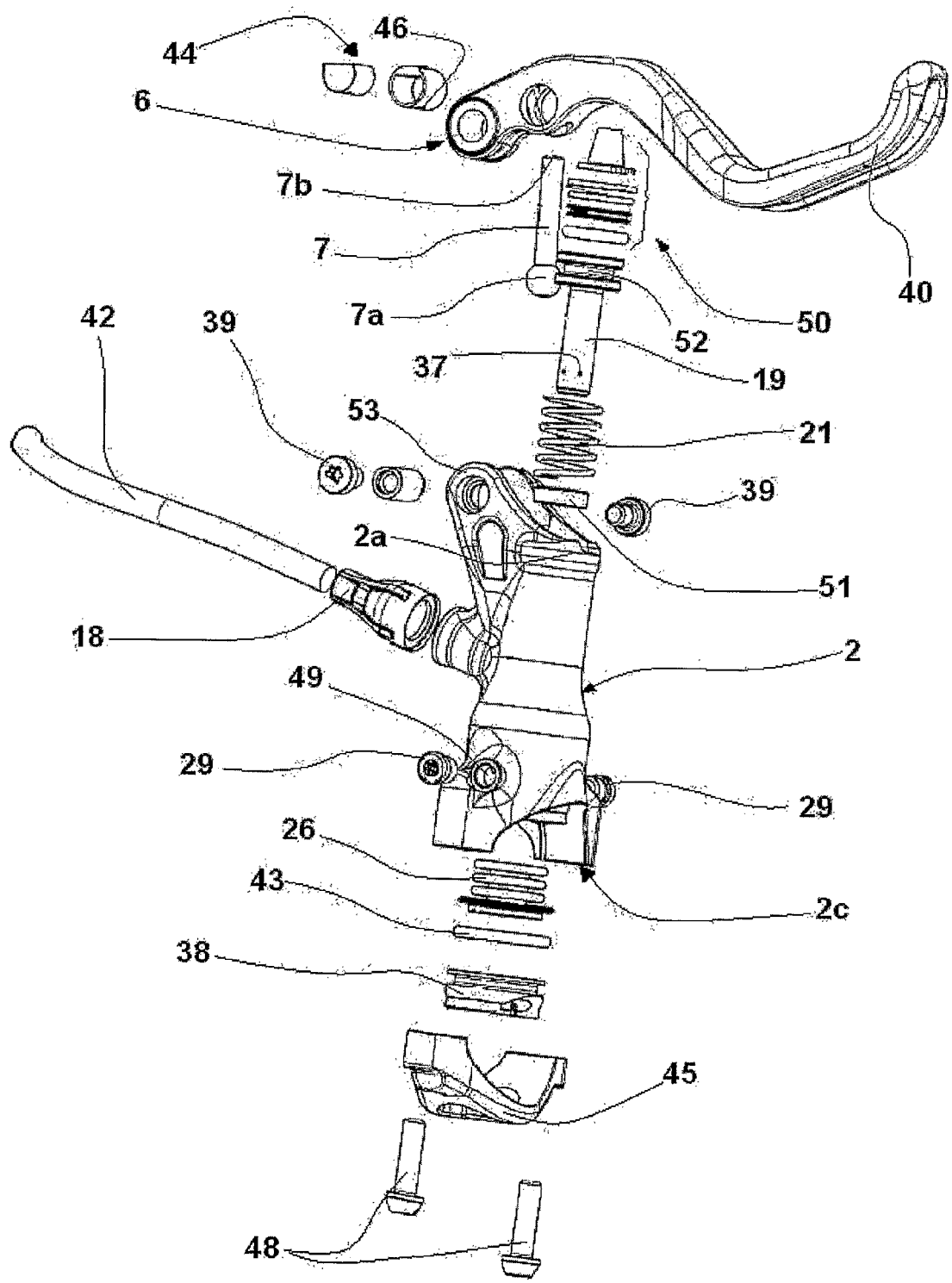
FIG. 9 shows an exploded view of a hydraulic brake shown in FIGS. 7 and 8.

Described herebelow with reference to FIGS. 7-9 is a possible application of a hydraulic pump 1, according to the present invention, for making a hydraulic brake for a bicycle or motorcycle.

In this embodiment, the actuation means 6 of pumps 1 comprise the rod 7 driven by a brake's lever 40 apt to be operated by the user's hand.

As it is known, the hydraulic brakes for cycles and motorcycles can be fixed by means of suitable fastening members 48 to a handlebar 35 so as to allow the user, having one hand on a knob 41 of the handlebar, to act on the lever 40 in order to move it close to the same knob 41 and thus operating the hydraulic brake.

More in particular, the lever 40 is hinged, free to rotate, onto the containment body 2 through a relevant pivot 39 supported by a projection 52 of same body 2.

Advantageously, the rod 7 may exhibit a device 44 for adjusting the travel of lever 40 in correspondence of the end 7b of same rod 7. In this type of known-per-se adjusting device 44, the end 7b of rod 7 is externally threaded and engages into a corresponding internal thread of a cylinder 46.

By rotating the rod 7, it is possible to adjust the distance, under rest condition, between the lever 40 and the knob 41.

The hydraulic pump 1 is interposed between the handlebar 35 and the lever 40.

In particular, the compensating reservoir 12 is closed by a respective plug 38 which is kept under pressure onto a gasket 43 via a small collar 45 screwed onto the handlebar 35 by respective fastening elements 48.

More in particular, a portion 2c of the containment body 2, and the small collar 45 are so shaped as to be able to embrace the handlebar 35 and be coupled stably thereon.

In this embodiment, a flexible cable 42 is fitted onto the connector 18 and is able to deliver the fluid to a hydraulic servo actuator such as a brake caliper.

Also shown in FIG. 7 is the arrangement of the main conduit 36 having connected thereto the secondary conduits 37 formed inside the stem 19 and moving solid therewith.

Referring now to FIGS. 8 and 9, it can be seen that the hydraulic pump comprises a containment body provided with holes 49 normally closed by screws 29, said holes being used for a visual control of the fluid inside the reservoir 12 or for the drainage thereof.

The example of FIGS. 7-9 has been given with reference to the embodiment of the pump 1 shown in FIGS. 4-6a. However, it is understood that other embodiments of the pump 1 can be constructed, in particular of the type illustrated in FIGS. 1 to 3.

Advantageously, a brake for bicycles and motorcycles as illustrated in FIGS. 7-9 exhibits a shape of "radial" type, that is, with the axis "X" of the pump's piston being substantially perpendicular to the axis "Y" of handlebar 35, so that the said brake is characterized by ad advantageous lever ratio which allows the user, the breaking force being equal, to act with lesser force onto the lever 40 than in the case of different brakes, such as "axial" pump-type, for example.

At the same time, a brake according to the invention has the reservoir 12 lined up with the cylinder of pump 1 and disposed between the cylinder and the handlebar 35.

FIG. 9 is an exploded view of the brake of FIGS. 7 and 8, showing in particular the shape of end 2c of body 2 complementary to the handlebar 35 for the fixing of the semicircular collar 45 above described.

Preferably, in the embodiment of FIG. 9, also the plug 38 of reservoir 12 is shaped complementarily to the handlebar 35, against which it is compressed through a clamping action exerted by the fastening members 48 between the portion 2c of body 2 and semicircular small collar 45.

Also viewable in FIG. 9 is the shape of the main body 2 having an open portion 2d into which there are inserted a main gasket 51, a spiral spring 21, the stem 19 and a pack of sealing elements 50, in this order.

The rod 7 is inserted, as already shown in FIG. 7, inside the pack of sealing elements 50, with the end 7a being engaged into a corresponding cavity 52 of stem 19.

The invention solves the problems encountered in the prior art and achieve the proposed objects.

In fact, the total volume and the weight of the pump, according to the invention, are remarkably reduced with respect to those of a traditional pump.

Such characteristics make it possible to assemble the pump in the most suited positions, for example on motorcycles or bicycles, so as not to hamper the movements of the driver and to concentrate the masses at such positions as to minimize the inertias and maximize the performance of the means in question.

Moreover, the means 13 for closing or opening the connection between the reservoir 12 and the cylindrical cavity 3—besides conferring the pump the compact construction which is provided with—allow closing with extreme rapidity the said connection and increasing the readiness and efficacy of the braking.

The invention thus conceived is evidently suited for industrial application; the same invention can also be subjected to several modifications and changes falling within the scope of the inventive idea; moreover, all the parts may be replaced by other elements technically equivalent.

The invention claimed is:

1. A hydraulic pump, comprising:
   a containment body having a cylindrical cavity inside thereof, said containment body being provided with a conduit communicating with a hydraulic actuator and capable of holding a fluid;
   a piston having a stem, said stem being axially movable in the cylindrical cavity;
   a reservoir for compensation of the fluid which is in fluid communication with the cylindrical cavity;
   an actuation means connected to the piston to move the piston within the cylindrical cavity and to operate the hydraulic actuator;
   a closing means for closing or opening the communication between the reservoir and the cylindrical cavity in response to movement of said piston in said cylindrical cavity, wherein the reservoir is axially in line with said cylindrical cavity, said reservoir being disposed axially adjacent to said cylindrical cavity, said reservoir and said cavity communicating through a port arranged between said reservoir and said cylindrical cavity; and
   a deformable wall delimiting said reservoir to compensate for a variation of volume of said reservoir deriving from the sliding of the stem of said piston within said reservoir and from wear of one or more pads associated with said hydraulic actuator, said stem having a stem end portion, said actuation means moving said piston such that said stem end portion moves between a first position and a second position, at least a portion of said stem end portion being located at a spaced location from said reservoir in said first position, wherein said portion of said stem end portion is located outside of said reservoir in said first position, said portion of said stem end portion being located within said reservoir in said second position.

2. A pump according to claim 1, wherein the means for closing or opening the connection between the reservoir and said cylindrical cavity comprises a closing device movable in consequence of the displacement of piston between a position of opening and one of closing of said port for communication between said reservoir and said cylindrical cavity.

3. A pump according to claim 1, wherein the deformable wall is deformable between a first position close to the port, and a second position from said port.

4. A pump according to claim 1, wherein the deformable wall is an elastically deformable membrane.

5. A pump according to claim 1, wherein the deformable wall is a movable diaphragm.

6. A pump according to claim 1, wherein the conduit for communication with the actuator is located on a side wall of the containment body.

7. A pump according to claim 1, wherein the conduit of communication with the actuator is in proximity to the communication port.

8. A pump according to claim 1, wherein the compensating reservoir is delimited by the containment body.

9. A pump according to claim 1, wherein said actuator is a brake caliper.

10. A pump according to claim 1, wherein said pump is associated with a handlebar of a bicycle or motorcycle, said pump being operated by a lever moving close to said handlebar.

11. A hydraulic pump according to claim 1, wherein said cylindrical cavity comprises a cylindrical cavity longitudinal axis, said reservoir comprising a reservoir longitudinal axis, said port comprising a port longitudinal axis, said reservoir longitudinal axis being aligned with said cylindrical cavity longitudinal axis and said port longitudinal axis to define a pump longitudinal axis, said cylindrical cavity being located at an axially spaced location from said reservoir with respect to an axial direction of said pump longitudinal axis.

12. A bicycle, comprising:
a pump comprising a containment body having a cylindrical cavity in an interior thereof, said cylindrical cavity being provided with a conduit communicating with a hydraulic actuator and capable of holding a fluid, said pump further comprising a piston axially movable in the cylindrical cavity, a reservoir for compensation of the fluid which is in fluid communication with the cylindrical cavity, an actuation means connected to the piston to move the piston within the cylindrical cavity and to operate the hydraulic actuator, a closing means for closing or opening the communication between the reservoir and the cylindrical cavity in response to movement of said piston in said cylindrical cavity, wherein the reservoir is axially aligned with said cylindrical cavity, said reservoir being disposed axially adjacent to said cylindrical cavity, said reservoir and said cavity communicating through a port arranged between said reservoir and said cylindrical cavity, said pump further comprising a deformable wall delimiting said reservoir to compensate for a variation of volume of said reservoir deriving from the sliding of the stem of said piston within said reservoir and from wear of one or more pads associated with said hydraulic actuator, said stem having a stem end portion, said actuation means moving said piston such that said stem end portion moves between a first position and a second position, at least a portion of said stem end portion being located at a spaced location from said reservoir in said first position, wherein said portion of said stem end portion is located outside of said reservoir in said first position, said portion of said stem end portion being located within said reservoir in said second position.

13. A hydraulic pump comprising:
a containment body having a cylindrical cavity;
a conduit communicating with a hydraulic actuator;
a piston axially movable in said cylindrical cavity;
a reservoir for compensation of fluid in communication with said cylindrical cavity, said reservoir being disposed axially adjacent to said cylindrical cavity;
an actuating means connected to said piston for moving said piston within said cylindrical cavity and for operating said hydraulic actuator;
a stem connected to said piston, said stem comprising conduits for passage of the fluid between said reservoir and said cylindrical cavity;
a sealing means sliding on said stem for closing the communication between said reservoir and said cylindrical cavity in response to movement of said piston in said cylindrical cavity between a rest position and an active position; and
a deformable wall delimiting said reservoir to compensate for variation of volume of said reservoir deriving from sliding of the stem of said piston within said reservoir and from wear of one or more pads associated with said hydraulic actuator, said stem partially penetrating into said reservoir in said active position of said piston, wherein said conduits of said stem comprise a first conduit substantially oriented in a direction parallel to said cylindrical cavity, said conduits of said stem comprising second conduits communicating with said first conduit, said second conduits being formed within said stem, said first conduit and said second conduits being formed within an end portion of said stem.

14. A hydraulic pump comprising:
a containment body having a cylindrical cavity;
a conduit communicating with a hydraulic actuator;
a piston axially movable in said cylindrical cavity;
a reservoir for compensation of fluid in communication with said cylindrical cavity, said reservoir being disposed axially adjacent to said cylindrical cavity;
an actuating means connected to said piston for moving said piston within said cylindrical cavity and for operating said hydraulic actuator;
a stem connected to said piston, said stem comprising conduits for passage of the fluid between said reservoir and said cylindrical cavity;
a sealing means sliding on said stem for closing the communication between said reservoir and said cylindrical cavity in response to movement of said piston in said cylindrical cavity between a rest position and an active position; and
a deformable wall delimiting said reservoir to compensate for variation of volume of said reservoir deriving from sliding of the stem of said piston within said reservoir and from wear of one or more pads associated with said hydraulic actuator, said stem partially penetrating into said reservoir in said active position of said piston, wherein said stem has a stem end portion, said actuating means moving said piston such that said stem end portion moves between a first position and a second position, at least a portion of said stem end portion being located at a spaced location from said reservoir in said first position, wherein said portion of said stem end portion is located outside of said reservoir in said first position, said portion of said stem end portion being located within said reservoir in said second position.

* * * * *